United States Patent

[11] 3,615,557

| | | | |
|---|---|---|---|
| [72] | Inventor | Alex Wasy D'Cruz |
| | | Somerset, N.J. |
| [21] | Appl. No. | 856,194 |
| [22] | Filed | Sept. 8, 1969 |
| [45] | Patented | Oct. 26, 1971 |
| [73] | Assignee | E. I. du Pont de Nemours and Company |
| | | Wilmington, Del. |
| | | Continuation of application Ser. No. 547,154, May 3, 1966, now abandoned. |

[54] PHOTOGRAPHIC FILMS COMPRISING AN ADHESIVE-SUBBING LAYER FOR A PHOTOGRAPHIC EMULSION
5 Claims, No Drawings

[52] U.S. Cl. .................................................. 96/87 R, 117/138.8 F, 260/78.5 BB
[51] Int. Cl. .................................................. G03c 1/80
[50] Field of Search ...................................... 96/87

[56] References Cited
UNITED STATES PATENTS

| 2,627,088 | 2/1953 | Alles et al. ................... | 96/84 X |
| 2,698,240 | 12/1954 | Alles et al. ................... | 96/87 |
| 2,794,742 | 6/1957 | Fowler et al. ................. | 260/80.8 X |
| 3,231,534 | 1/1966 | Blades et al. ................. | 260/85.7 X |
| 3,296,169 | 1/1967 | Corey ........................... | 260/29.6 |
| 3,370,951 | 2/1968 | Hasenauer et al. ............ | 96/87 |

*Primary Examiner*—Ronald H. Smith
*Attorney*—Lynn Barratt Morris

ABSTRACT: Photographic films comprising a biaxially oriented polyester film support having on at least one surface a thin layer of a tri-component copolymer of:
 a. about 70 to 90 parts by weight of vinyl acetate,
 b. about 7 to 40 parts by weight of a lower alkyl acrylate, and
 c. about 3 to 30 parts by weight of an unsaturated acid of the group comprising itaconic acid, fumaric acid, acrylic acid or methacrylic acid, and carried by said layer a water-permeable colloid, silver halide emulsion layer. The novel copolymers are useful for substrata for drafting films. The substrata can contain pigments or dyes.

PHOTOGRAPHIC FILMS COMPRISING AN ADHESIVE-SUBBING LAYER FOR A PHOTOGRAPHIC EMULSION

This application is a continuation of my prior application, Ser. No. 547,154, filed May 3, 1966 now abandoned.

This invention relates to the subbing of photographic film and more particularly to the use of a single photographic emulsion anchoring substratum (commonly known as a subbing layer or sub) which is applied to polyester after stretching. Still more particularly, it relates to a novel subbing composition which is applied to oriented (biaxially stretched) polyethylene terephthalate.

Photographic film supports made from polyesters such as polyethylene terephthalate have relatively hydrophobic surfaces, and do not adhere well to hydrophilic coatings containing gelatin or other natural or synthetic water-permeable organic colloid binding agents. Because the polyester surface may be relatively chemically inert, it is not dissolved by customarily used coating solvents; and therefore, a mechanical interlocking of coating and support cannot be readily obtained.

This invention provides new adhesives for adhering aqueous emulsions to a support and is accomplished by coating a photographic film support with a coating composition comprising an aqueous dispersible vinyl acetate-alkyl acrylate-unsaturated acid copolymer. The coated supports of this invention have very good flexibility and provide exceptionally good wet and dry anchorage for gelatin coatings, e.g., gelatin-subbing treatments, nonhalation layers and photographic emulsions.

The first component is vinyl acetate. The alkyl acrylate may be methyl, ethyl, n-propyl or n-butyl acrylate. The third component is an unsaturated acid such as itaconic acid, fumaric acid, acrylic or methacrylic acid. The copolymer may be made by any convenient method well-known to the art. For example, an aqueous emulsion of the components may be polymerized to produce a polymer latex.

The polymer latex is coated onto the biaxially oriented polymer and dried at 100°–150° C. The initial pH of the polymer latex is approximately 3. Adhesion with a single sub system is greatly improved when the aqueous emulsion is applied to a polyester base which has been treated with electrical discharge, flame treatment, surface oxidation, ultraviolet light exposure, and the like.

The invention will now be illustrated, but is not intended to be limited, by the following procedures and examples.

PROCEDURE A

A subbing composition comprising vinyl acetate, methyl acrylate and itaconic acid is prepared as follows.

The following are placed in a suitable vessel:

|  | Parts by Weight |
|---|---|
| Vinyl Acetate | 100 |
| Methyl Acrylate (deinhibited)* | 10 |
| Itaconic Acid | 6 |
| 30% Sodium Lauryl Sulfate in water (by weight) | 5 |
| Water | 300 |

*with activated alumina

The mixture is stirred and purged with nitrogen in a vessel provided with a reflux condenser for about 15 minutes. The temperature of the reaction mixture is raised to 50° C., and 0.5 part by weight of ammonium persulfate dissolved in 10 parts by weight water and 0.4 part by weight of sodium metabisulfite dissolved in 10 parts by weight water are added. The milky white, slightly colored solution immediately becomes translucent upon the addition of ammonium persulfate and temperature in the flask rises to 80° C. The reaction temperature is maintained by between 70° and 80° C. for 1 hour. A milky white, chalklike material is obtained.

PROCEDURE B

The composition is made in a manner similar to the composition of procedure A except 6 parts by weight of fumaric acid is used in place of the itaconic acid. A milky white, chalklike material is obtained.

PROCEDURE C

The composition is made in a manner similar to the composition of procedure B except 10 parts by weight of ethyl acrylate is used in place of the methyl acrylate. A milky white, chalklike material is obtained.

EXAMPLE I

Polyethylene terephthalate films are cast and biaxially stretched about three times in unit length and width at a temperature of about 88° C. to provide a final thickness of about 0.004 and 0.007 inch respectively and then heat-set after the manner described in example I of Alles, U.S. Pat. No. 2,779,684.

The surface of the films are then treated with electrical discharge after the manner described in Travers, U.S. Pat. No. 3,113,208. The rods are charged by a high voltage generator at 1.4 amps and 1,100 watts and 10,000 volts.

Material prepared as described in procedure A is diluted with distilled water to a concentration of 3 percent solids. The resulting aqueous dispersion is then used to coat one side of each of the biaxially oriented polyethylene terephthalate films. Coating is accomplished by the air-knife technique; the polymer coating mixture temperature is 35° C. The coated films are then heat relaxed at 150° C. for 2 minutes as described in U.S. Pat. No. 2,779,684. A gelatino silver halide photographic emulsion of the lithographic type is then coated on each of the polymer coated surfaces. The emulsion comprises 52 mg. gelatin per 82 mg. silver halide; (30 mole percent AgBr and 70 mole percent AgCl) and contains hardening restrainers such as 2,4-dihydroxy-benzaldehyde and polyhydroxybenzene as described in Harriman, U.S. Pat. No. 2,591,542.

The films are found to have excellent wet anchorage when tested by exposing samples to white light, processing in a standard lithographic developer of the hydroquinone-paraformaldehyde type, fixing, and, after washing, but before drying, scribing two lines 2 inches long and one-half inch apart through the emulsion layer with a phonograph needle and rubbing across the marks with a rubber squeegee. The coating showed no tendency to peel from either base. The test for dry anchorage is made by taking a sample film, coated as above, exposing it to white light, and processing as described above. The processed and dried sample is then scored with a phonograph needle to produce four parallel scratches through the emulsion layer one-fourth inch apart. A series of lines is then scored across these lines at an angle of about 60° to them and about one-fourth inch apart to produce three lines of nine rhomboid figures scratched through the emulsion layer. A piece of cellophane, pressure-sensitive, adhesive tape is then pressed down over the scored area and a loose end of the tape grasped at about a 90° angle to the film surface. The tape is pulled up briskly and an arbitrary measure of adhesion is obtained by comparing each group of 10 samples with a graded series of standards prepared with films having excellent to very poor anchorage. The arbitrary scale ranges from a value of 0 for excellent anchorage to 10 for very poor anchorage. Tested in this manner, the samples of experimental film rate from 0 to 1 on the arbitrary scale, which is excellent.

EXAMPLE II

Films are made in a manner similar to the films of example I, except the polymer subbing dispersion, prepared as described in procedure A, is adjusted to 8.5 percent polymer solids. When tested as described in example I, the results are equivalent to those obtained in example I.

EXAMPLE III

A series of films is prepared using the copolymers described in procedures B and C. Each copolymer is coated on an electrically discharged film as described in example I using water dispersions of 3 percent and 8.5 percent concentration of solids. Tested in the manner of example I, the sample films prepared with the subbing layers of procedures B and C give excellent wet anchorage adhesion and rate on the arbitrary scale, 0–1 for dry adhesion, which is excellent. A series of films is made as described in this example, except that the surface of the film is subjected to flame treatment after the manner described in Bryan, U.S. Pat. No. 3,145,242, rather than subjected to electrical discharge.

EXAMPLE IV

The surface of a polyethylene terephthalate film is treated with an air-propane flame and then coated with a vinyl acetate/methyl acrylate/itaconic acid (90/10/10) polymer diluted to 6 percent solids. Tested in the manner of example I, the results are excellent giving an arbitrary scale rating of 0 to 1.

EXAMPLE V

Material prepared as described in procedure A is treated with a saturated potassium nitrate solution. The copolymer coagulated. The coagulated copolymer is collected by suction filtration, washed with hot water, and dried in a vacuum oven at 40° C. The copolymer is then dissolved in acetone and coated onto biaxially oriented polyethylene terephthalate, dried, and the film is heat relaxed at 125° C. for 2 minutes. Good wet and dry adhesion are obtained.

EXAMPLE VI

Material is prepared as described in example V except the copolymer is dissolved in methylene chloride and coated onto film which is treated with electrical discharge after the manner described in example I. The coated film is heat relaxed at 150° for 2 minutes. Excellent wet and dry adhesion are obtained.

Other surface treatments for enhancing adhesion may be employed. These include treating the surface with peroxides associated with sodium hydroxide, chromic acid in sulfuric acid, and oxygen or ozone in the presence of ultraviolet light according to known procedures.

The resultant copolymers of this invention are not crosslinked and therefore can be easily dissolved in common organic solvents and applied to stretched base. Thus, these adhesive copolymers can be coated from an aqueous system or they can be coated from organic solvents and used in the presently available coating apparatus that already utilize the organic solvent systems.

With any of the above systems, care must be taken to avoid processing the film with formaldehyde or film in which formaldehyde has been placed. Formaldehyde has the deleterious effects of producing excess fog, desensitization, flattering of gradation in the processed film, and after hardening. If formaldehyde is present, a substance should be placed in the film, etc. to nullify or slow down the effect of the formaldehyde after the manner described in Harriman, U.S. Pat. No. 2,591,542.

The amounts of monomers used in each case generally falls within the following range:

|  | Parts by weight |
|---|---|
| Vinyl acetate | 70–90 |
| Unsaturated acids | 3–30 |
| Alkyl acrylate | 7–40 |

These polymers are applied to the biaxially stretched base preferably after it has been treated, e.g., by electrical discharge. The base with the sub applied to it is heat relaxed at a minimum of 125° C. for 3 minutes and a maximum of 180° C. for 1 minute.

The film support for the emulsion layers used in the novel precess may be any suitable plastic which is preferably transparent. For example, the cellulosic supports, e.g. cellulose acetate, cellulose triacetate, cellulose acetate butyrate, etc., may be used. Polymerized vinyl compounds, e.g., copolymerized vinyl acetate and vinyl chloride, polystyrene and polymerized acrylates may also be mentioned. The film formed from the polyesterification product of a dicarboxylic acid and a dihydric alcohol made according to the teachings of Alles, U.S. Pat. No. 2,779,684, and the patents referred to in the specification of that patent are eminently satisfactory. Other suitable supports are the polyethylene terephthalate/isophthalates of British Pat. No. 766,290 and Canadian Pat. No. 562,672 and those obtainable by condensing terephthalic acid and dimethyl terephthalate with propylene glycol, diethylene glycol, tetramethylene glycol or cyclohexane 1,4-dimethanol (hexahydro-p-xylene alcohol). The films of Bauer et al., U.S. Pat. No. 3,052,543 may also be used. The above polyester films are particularly suitable because of their dimensional stability. The polyester films may contain pigments or dyes as known to the art, or may include various matting agents, e.g., silica particles.

The subbing compositions of the present invention are ideally suited for the reception of gelatin coating, e.g., gelatin-subbing treatments, nonhalation layers and photographic emulsions.

In place of part or all of the gelatin other natural or synthetic water-permeable organic colloid-binding agents can be used in the intermediate or photographic emulsion layers coated on the substratum layers of the present invention. Such agents include water-permeable or water-soluble polyvinyl alcohol and its derivatives, e.g., partially hydrolyzed polyvinyl acetates, polyvinyl ethers, and acetals containing a large number of extralinear—2CHOH—groups; hydrolyzed interpolymers of vinyl acetate and unsaturated addition polymerizable compounds such as maleic anhydride, acrylic and methacrylic acid ethyl esters, and styrene. Suitable mixed colloid emulsions are described in U.S. applications, Nottorf Ser. Nos. 94,989 U.S. Pat. No. 3,142,568, July 27, 1964) and 134,109 (U.S. Pat No. 3,325,286, June 13, 1967,) filed Mar. 13, 1961 and Aug. 28, 1961, respectively, and Cohen and Shacklett, Ser. Nos. 122,653 U.S. Pat. No. 3,252,801, May 24, 1966) and 176,140 (U.S. Pat. No. 3,203,804, Aug. 31, 1965,) filed July 10, 1961 and Feb. 27, 1962, respectively. The useful polyvinyl acetals include polyvinyl acetaldehyde acetal, polyvinyl butyraldehyde acetal and polyvinyl sodium o-sulfobenzaldehyde acetal. Other useful colloid-binding agents include the poly-N-vinyllactams of Bolton, U.S. Pat. No. 2,495,918, the hydrophilic copolymers of N-acrylamido alkyl betaines described in Shacklett, U.S. Pat. No. 2,833,650, and hydrophilic cellulose ethers and esters.

In addition to serving as substratum anchoring layers for photographic coatings, the coatings of the present invention also provide strongly adherent, flexible substrata for drafting film coating, e.g., the ureaformaldehyde and melamine formaldehyde coatings of Van Stappen, U.S. Pat No. 2,964,423, and the matted acrylic coatings of Moede, U.S. application, Ser. No. 339,849, filed Jan. 24, 1964 (U.S. Pat. No. 3,353,958, Nov. 21, 1967.)

The subbing compositions and/or subsequent coatings can be applied to the web supports or films by any method known to the art, e.g., dip or skim coating, or coating with rollers. The dry-coating thicknesses are generally about 3 to 4 milligrams per square decimeter. Suitable coating methods are shown in Heilman, U.S. Pat. No. 3,025,828; Wamsley, U.S. Pat. No. 3,038,441; Brandsma et al., U.S. Pat. No. 3,063,868, and Haley, U.S. Pat. No. 3,082,144. Various coating aids and surfactants may be added in the manner known to the art, but must be compatible with the surfactants, if any, already present and not deleterious to subsequently applied coatings, e.g., photographic emulsions.

The subbing compositions may contain various pigments and dyes for various purposes, e.g., carbon black, barium sulfate, titanium dioxide, zinc oxide, magnesium oxide, silicon dioxide, phthalocyanines and other organic and inorganic pigments can be used as well as various dyes, e.g., among the dyes useful in the invention are Fuchsine (C.I. 42510), Auramine Base (C.I.41000B), Calcocid Green S (C.I. 44090), Para Magneta (C.I. 42500), Tryparosan (C.I. 42505), New Magenta (C.I. 42520), Acid Violet RRL (C.I. 42425), Red Violet 5RS (C.I. 42690), Nile Blue 2B (C.I. 51185), New Methylene Blue GG (C.I. 51195), C.I. Basic Blue 20 (C.I. 42585), Iodine Green (C.I. 42556), Night Green B (C.I. 42115), C.I. Direct Yellow 9 (C.I. 19540), C.I. Acid Yellow 17 (C.I. 18965), C.I. Acid Yellow 29 (C.I. 18900), Tartrazine 19140), Supramine Yellow G (C.I. 19300), Buffalo Black 10B (C.I. 27790), Naphthalene Black 12R (C.I. 20350), Fast Black L (C.I. 51215), and Ethyl Violet (C.I. 42600).

The embodiments of the invention in which an exclusive property or privilege is claimed are defined as follows:

1. A photographic film element comprising a biaxially oriented polyester film support having on at least one surface a thin layer of a tri-component copolymer of
    a. about 70 to 90 parts by weight of vinyl acetate,
    b. about 7 to 40 parts by weight of methyl, ethyl, n-propyl, or n-butyl acrylate, and
    c. about 3 to 30 parts by weight of an unsaturated acid of the group consisting of itaconic acid, fumaric acid, acrylic acid and methacrylic acid, and carried by said layer a water-permeable colloid, silver halide emulsion layer.

2. A photographic element as defined in claim 1, wherein said support is a biaxially oriented polyethylene terephthalate film.

3. A photographic element as defined in claim 1, wherein component (b) is methyl acrylate and component (c) is itaconic acid.

4. A photographic element as defined in claim 1, wherein component (b) is ethyl acrylate and component (c) is itaconic acid.

5. An element as defined in claim 1, wherein said colloid is gelatin.

* * * * *